US006664474B1

(12) United States Patent
Gunnels

(10) Patent No.: US 6,664,474 B1
(45) **Date of Patent: *Dec. 16, 2003**

(54) SHIELD SLOT TAP

(75) Inventor: Robert Gunnels, Lockport, IL (US)

(73) Assignee: Andrew Corporation, Orland Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/064,946

(22) Filed: Aug. 30, 2002

(51) Int. Cl.$^{7}$ .................................................. H02G 15/02
(52) U.S. Cl. .................................... 174/75 C; 174/88 C
(58) Field of Search ............................. 174/75 C, 71 C, 174/88 R, 88 C, 78; 333/245

(56) References Cited

U.S. PATENT DOCUMENTS 1,675,163 A 6/1928 Colburn
3,141,060 A * 7/1964 Norton ....................... 174/73.1
3,602,872 A 8/1971 Braunstein
4,283,595 A * 8/1981 Anosov et al. ............ 174/73.1
4,365,859 A 12/1982 Hutter
4,464,583 A * 8/1984 Holmgren .................... 307/147
4,479,031 A * 10/1984 Ishise et al. ............... 174/73.1
4,738,009 A 4/1988 Down
4,795,356 A 1/1989 Pauza
4,855,536 A * 8/1989 Varreng ..................... 174/73.1
5,281,933 A 1/1994 Chamberlin
6,312,281 B1 11/2001 Rodriguez
6,362,709 B1 3/2002 Paxman
6,392,504 B1 5/2002 Stein
6,417,456 B1 * 7/2002 Leijon et al. ......... 174/120 SC

* cited by examiner

*Primary Examiner*—Chau N. Nguyen
(74) *Attorney, Agent, or Firm*—Babcock IP, LLC

(57) ABSTRACT

A method and apparatus for forming a cable tap for coupling a co-axial trunk cable having a trunk outer conductor, to a tap cable. A channel is formed in the trunk outer conductor; a first tap conductor is coupled to a first side of the channel; and a second tap conductor is coupled to a second side of the channel. Alternatively, a trough may be formed and a conductor coupled with one end of the trough inserted. A fixture with an aperture for guiding a cutting tool to form a desired channel or trough may be supplied in a kit.

29 Claims, 9 Drawing Sheets

1 -11.102 dB
0.8 GHz
2 -10.851 dB
1 GHz
3 -10.737 dB
1.7 GHz
4 -9.9538 dB
2.2 GHz

1 -1.3802 dB
0.8 GHz
2 - .4154 dB
1 GHz
3 - . 5119 dB
1. 7 GHz
4 - .5845 dB
2.2 GHz

SHIELD SLOT TAP

BACKGROUND OF INVENTION

1. Field of the Invention

The invention relates to electrical cable taps. More specifically, the invention relates to a cable tap with low insertion losses and a variable coupling factor.

2. Description of Related Art

Many systems, for example in-building RF distribution systems or antenna arrays, utilize a trunk cable from which multiple connections, taps, are made. “Piggy back” cable taps permit the diversion of a signal from a trunk cable to a second cable, without requiring attachment of connectors to the trunk cable.

Conventional co-axial cable taps introduce a contact pin through an aperture created in the trunk cable’s shield/outer conductor that contacts the trunk cable’s center conductor. Creation of the aperture, without damaging the center conductor, is time consuming and normally requires a dedicated tool.

The contact pin of a conventional co-axial cable tap creates a significant impedance discontinuity with mismatch loss. The mismatch loss, combined with radiation and coupled energy losses, may create an insertion loss of up to approximately 1.5 dB with respect to the trunk cable, depending on the tap, trunk cable type and the operating frequency. Where energy conservation is desired, or multiple taps are required, the insertion loss from a conventional center conductor contacting co-axial cable tap may be significant.

Taps with low insertion losses exist. However, these devices require cutting the trunk cable at a desired insertion point, installing connectors at both sides of the break and insertion of the reactive tap, in-line. The separate structure of the tap, required connectors and time-consuming installation procedure may cause this type of tap to be undesirably expensive.

Competition within the tap connector market has also focused attention on minimization of materials and manufacturing costs.

Therefore, it is an object of the invention to provide a method, apparatus and a kit for a tap which overcomes deficiencies in the prior art.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

RF energy in a co-axial cable, propagates in the space between a center conductor and a surrounding outer conductor. The formation of a, for example, generally u-shaped slot/discontinuity (channel) in the trunk cable outer conductor/shield, having an open end and a closed end aligned parallel to the cable center longitudinal axis and an inside and an outside shield area with respect to the channel, interupts an RF current path between either shield area. The interupted RF current path around the channel induces a voltage potential between either side of the closed end of the u-shaped channel. Therefore, by connecting a second, for example, co-axial cable across the channel, a cable tap may be formed which couples RF energy but does not require contact with the center conductor of the trunk cable. Because the creation of a significant impedance discontinuity is avoided, reflective losses and therefore overall insertion loss due to the addition of the cable tap to the trunk cable is minimized.

Figure 1:
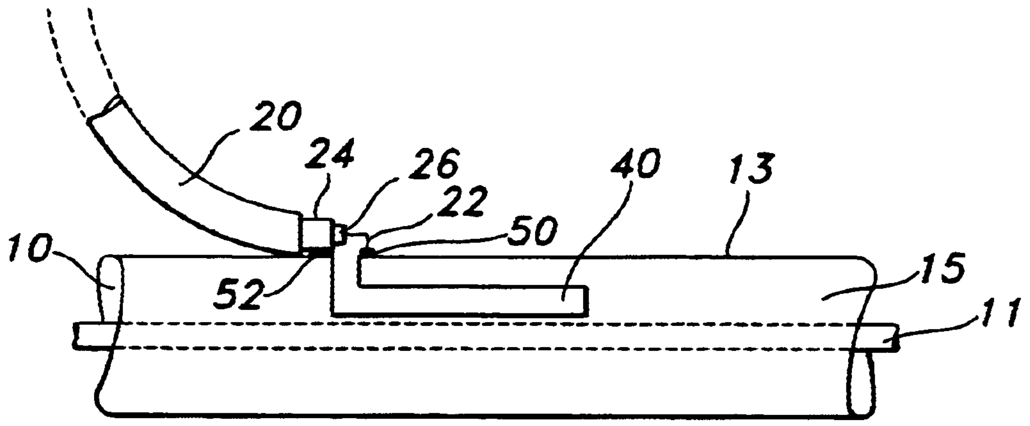
FIG. 1 shows a cut-away side view of a first embodiment of the invention.
Figure 2:
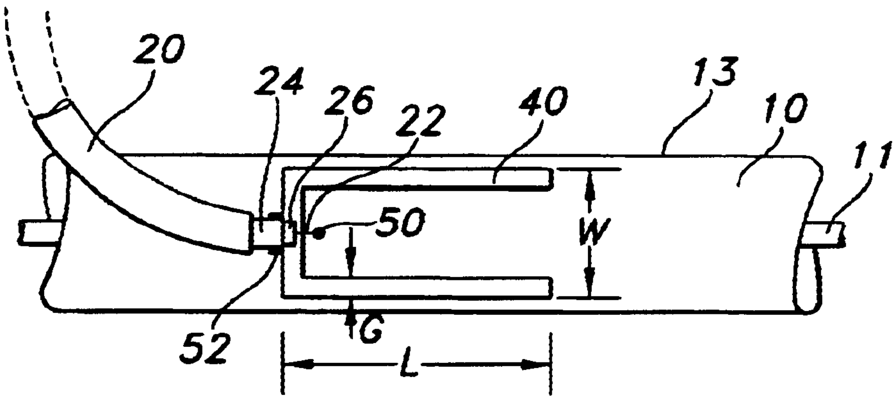
FIG. 2 shows an external top view of the first embodiment of the invention.
Figure 2A:
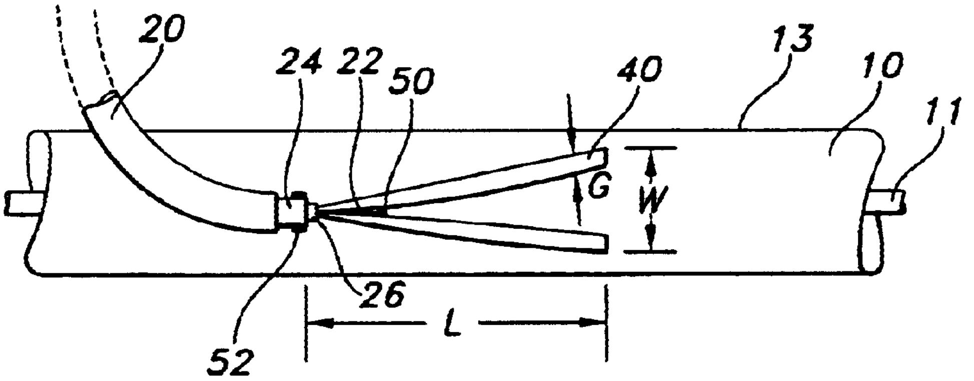
FIG. 2A shows an external top view of an alternative embodiment of the invention.
Figure 2B:
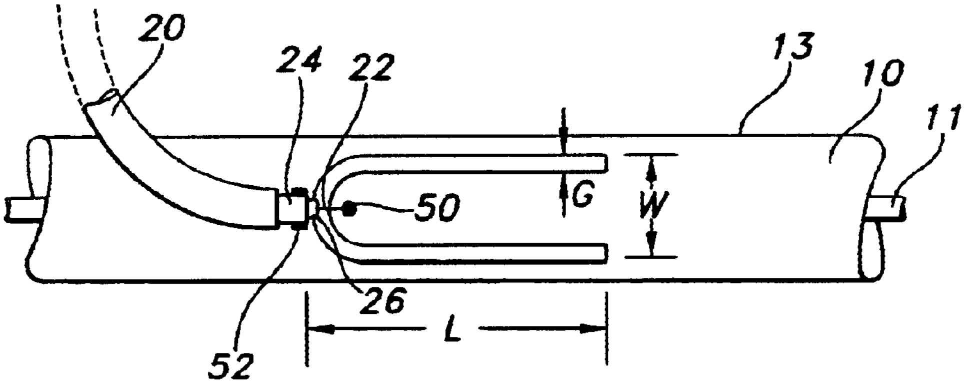
FIG. 2B shows an external top view of an alternative embodiment of the invention.

In a first embodiment, as shown in FIGS. 1 and 2, a co-axial trunk cable 10 has a trunk center conductor 11 spaced away from a trunk outer conductor 13 by a trunk dielectric 15. A, for example co-axial, tap cable 20 has a tap center conductor 22 spaced away from a tap outer conductor 24 by a tap dielectric 26. The trunk dielectric 15 and or tap dielectric 26 may be any material with suitable dielectric properties, including air. Further, the tap cable 20 may be any form of conductor, including for example micro strip conductors or a single conductor acting as a radiating element.

A channel 40 is formed through the trunk outer conductor 13 having a length L and a width W. The channel 40 may have a U-shape, open ended rectangular shape, V-shape or other form having an open end defined by the overall axial length L parallel to a center longitudinal axis of trunk cable 10 and a transverse width W or arc length around the trunk outer conductor 13. An open end of the channel 40 may be aligned facing either a RF generator or RF load end of trunk cable 10. A gap width G of the channel 40 may vary along the channel 40 but is at least large enough to create an electrical continuity break in the trunk outer conductor 13.

The tap center conductor 22 may be coupled with the trunk outer conductor 13 at an inside coupling point 50 proximate to the closed end of the channel 40. The tap outer conductor 24 may be coupled with an outside coupling point 52 of the closed end of the channel 40. Alternatively, the connection points of the tap center conductor 22 and tap outer conductor 24 may be reversed, i.e. coupled with coupling points 52 and 50, respectively.

Locations of the inside and outside coupling points 50,52 is not critical other than their locations being on either side of the channel 40 at points where an RF voltage differential exists. Dimensions L, W and G of the channel 40 and the location of connection points 50,52, determine a coupling level that is described herein below.

The coupling of the tap center conductor 22 and tap outer conductor 24 with the trunk outer conductor 13 may be, for example, via soldering, spring clip(s), direct mechanical connection or mechanical compression via elongated straps or mechanical clamp(s). Any manner of securing electrical connection may be used; with care taken that the manner selected does not provide a short circuit across the channel 40.

Figure 3:
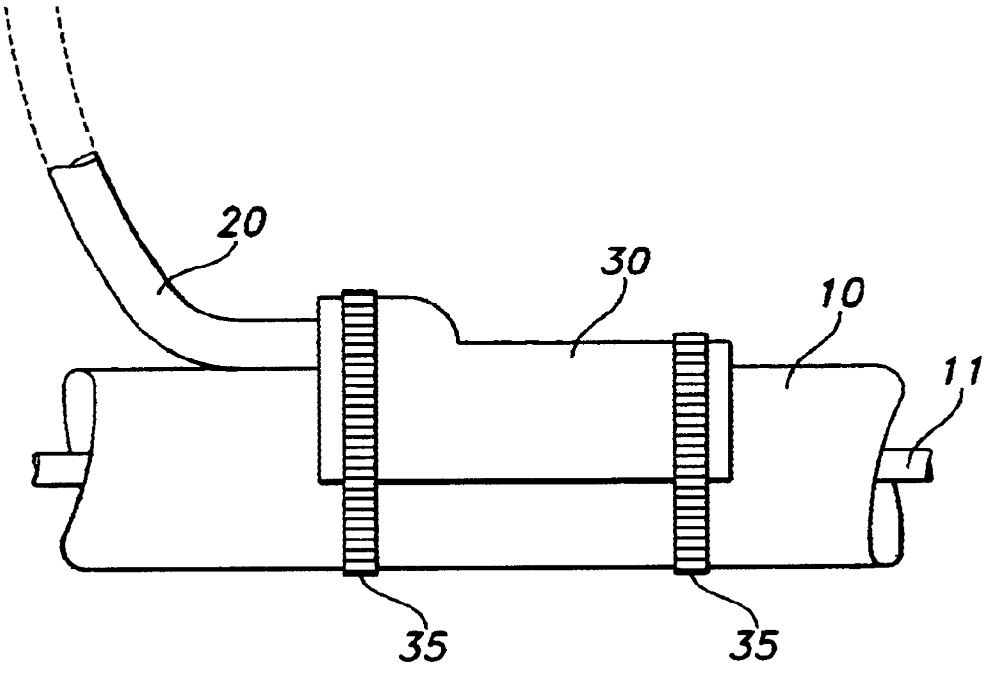
FIG. 3 shows an external side view of one embodiment of a cover usable with the invention.
Figure 3A:
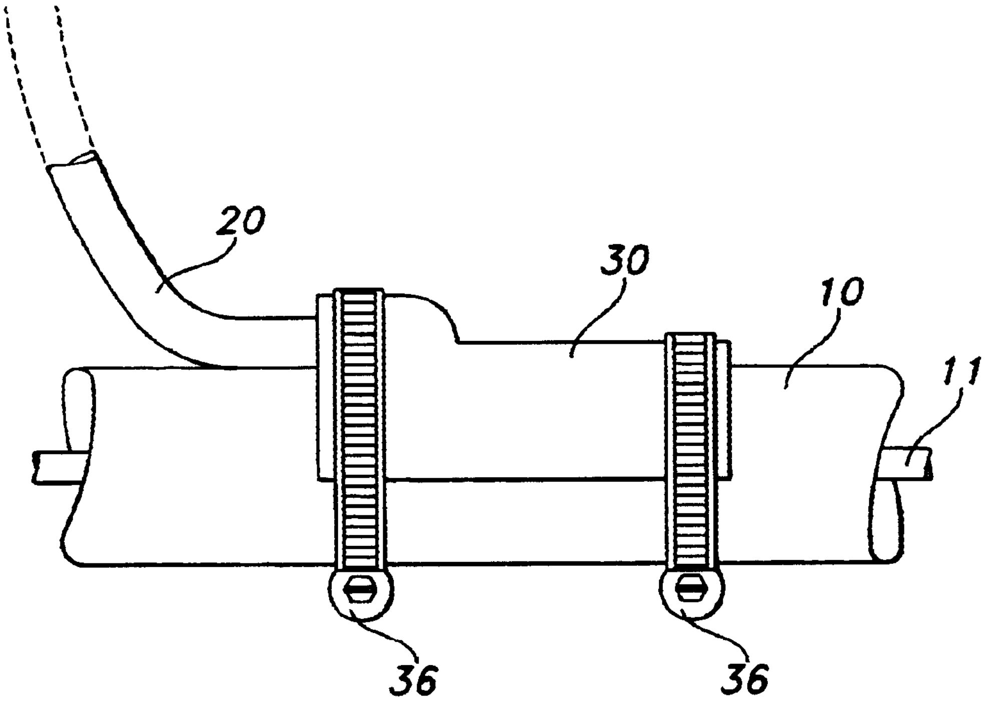
FIG. 3A shows an external side view of another embodiment of a cover usable with the invention.

As shown in FIG. 3, a cover 30 held in place, for example, by elongated straps 35, adhesive or mechanical clamps may be used to protect the tap from environmental contaminants and/or maintain the electrical coupling of the tap cable 20 with the trunk cable 10. The cover 30 may also include, insulated so as not to form a short circuit across the channel 40, an RF shield 33 to minimize RF energy radiation losses/interference from the trunk cable 10 through the channel 40 and from the exposed portion of the tap center conductor 22.

Figure 4:
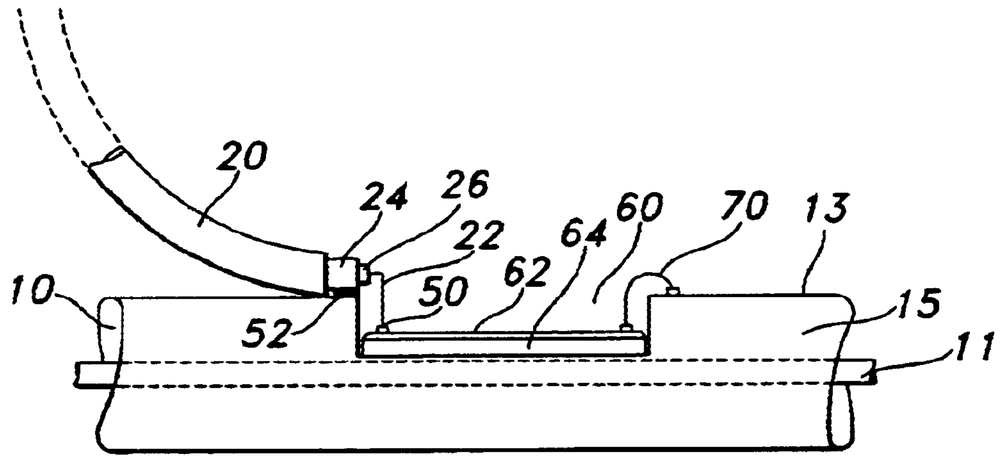
FIG. 4 shows a cut-away side view of a second embodiment of the invention.
Figure 5:
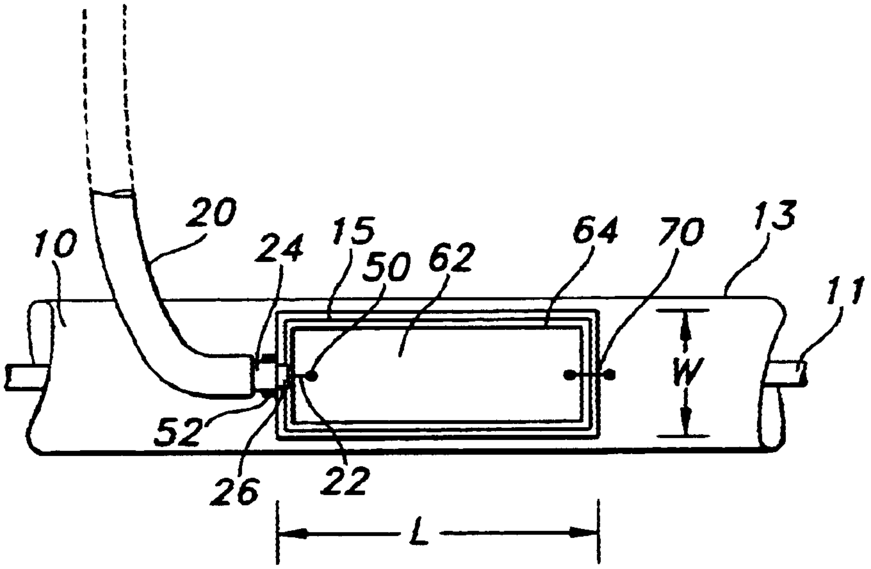
FIG. 5 shows an external top view of the second embodiment of the invention.
Figure 6:
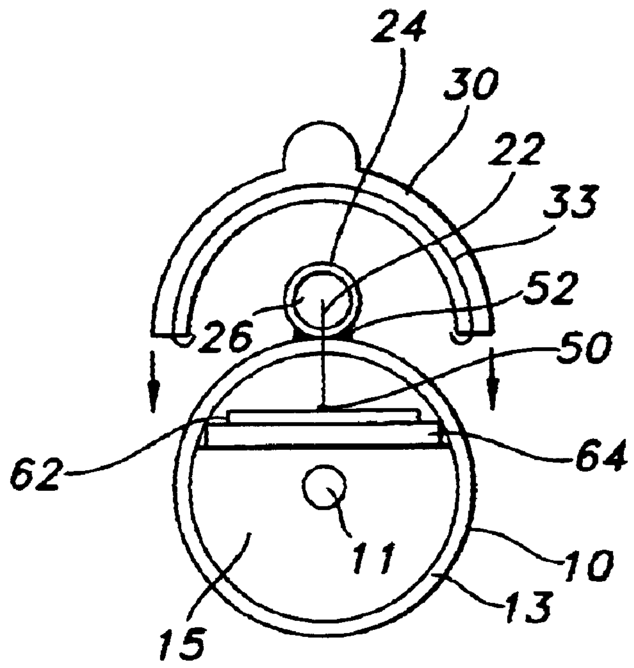
FIG. 6 shows a cross-section view of the second embodiment of the invention.

As shown in FIGS. 4, 5 and 6, a second embodiment may use an aperture or trough 60 formed in the trunk outer conductor 13. The trough 60 may be of any shape, generally having an overall length L and a width W. A conductor 62 is placed in the trough 60 with one end, along the trunk cable center longitudinal axis, in electrical contact with the trunk outer conductor 13 via a conductor/shield coupling 70 but otherwise electrically isolated from the trunk outer conductor 13, thereby creating an electrical equivalent of the channel 40 structure of the first embodiment. Conductor/shield coupling 70 may be, for example, via soldering, spring clip(s), direct mechanical connection or mechanical connection via elongated straps or mechanical clamp(s). Further, the conductor/shield coupling 70 may be omitted. The positioning of conductor 62 may, for example, be aided by the use of adhesive, elongated strap(s) or mechanical connection, for example to the trunk dielectric 15 or trunk center conductor 11.

The tap cable 20 is connected similarly to the first embodiment, with connections, for example, of the tap center conductor 22 to the trunk outer conductor 13 at an inside coupling point 50 of the closed end of the conductor 62 and a connection of the tap outer conductor 24 with an outside coupling point 52 of the closed end of the channel formed between the conductor 62 and the trunk outer conductor 13.

To ensure that the conductor 62 is isolated from the trunk outer conductor 13, the conductor 62 may be formed as a conductive layer spaced away from the edges of all but the back end of an insulating substrate 64, for example a printed circuit board (PCB). The portion of conductor 62 extending to a back end of the insulating substrate 64 may then become the conductor/shield coupling 70 coupled with the trunk outer conductor 13. If no conductor/shield coupling 70 is desired, the conductor 62 may be spaced away from all edges of the insulating substrate 64.

Figure 7:
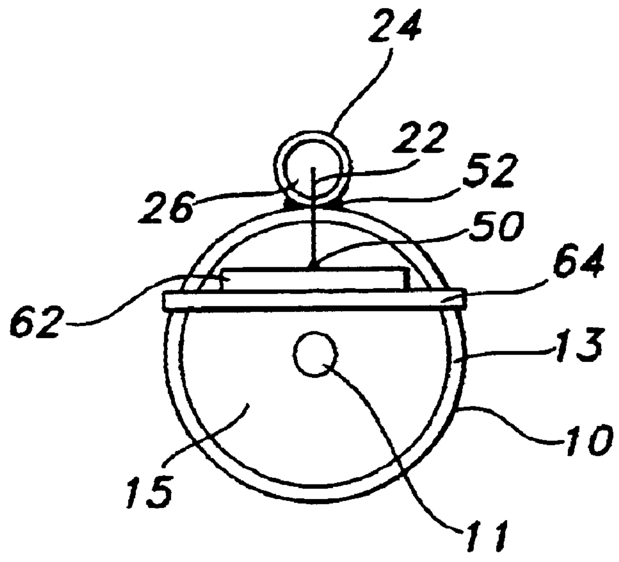
FIG. 7 shows a cross-section view of a third embodiment of the invention.

In a third embodiment as shown in FIG. 7, for example, where the trunk cable 10 has an air dielectric 15, the insulating substrate 64 may be dimensioned to fit against the edges of the trunk outer conductor 13 defining the trough 60 and or against the trunk center conductor 11, thereby maintaining a fixed location of the conductor 62, even where there is no dielectric material to support the insulating substrate 64.

The second embodiment may also use a cover 30 as shown, for example, in FIGS. 3 and 6, discussed herein above.

The channel 40 or trough 60 may be formed by cutting or otherwise removing at least trunk outer conductor 13 material and dielectric 15, if applicable, with a scroll saw, band saw, router, grinder, laser or other channel/trough forming device. Specific dimensions of the channel 40 or trough 60 may be formed using guides that may be made for specific trunk cable dimensions and types.

To form the, for example, open ended rectangular channel 40 using a scroll saw a first cross-sectional cut may be made in the trunk outer conductor 13 to a desired depth creating the W dimension. When the bottom of the first cut is reached, the angle of cutting is changed to be parallel to a center longitudinal axis of the trunk cable 10 for a length L of a longitudinal cut. The movement may then be reversed, allowing removal of the cutting element.

When using a cutting method that cuts across the cable, through the dielectric 15, the depth of the first cross-sectional cut should be shallow enough so that the trunk center conductor 11 is not contacted. Manipulation of the cutting angle across the trunk outer conductor 13 or use of a router or other controlled depth cutting method removes this requirement.

Alternatively, a trough 60 may be formed in the trunk cable 10 by making a single, for example with a grinding tool, or series of cross-sectional cut(s), removing trunk outer conductor 13 and if applicable trunk dielectric 15 from a desired length and width of the trunk cable 10.

The selected overall length L, width W and channel width G dimensions of the channel 40 or trough 60 determine a coupling factor of the cable tap. The coupling factor is a measure of how much of the total RF energy present in the trunk cable 10 is coupled to the tap cable 20, the remainder continuing along the trunk cable 10. Generally, increases in length L and width W increases coupling.

Figure 8A:
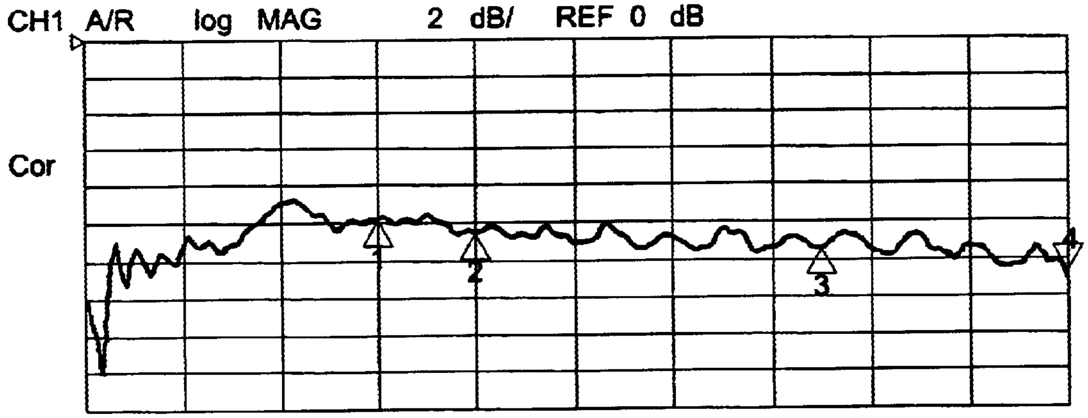
FIG. 8*a* shows test data representing the coupling loss of a center conductor tap (10 dB nominal) with respect to operating frequency.
Figure 8B:
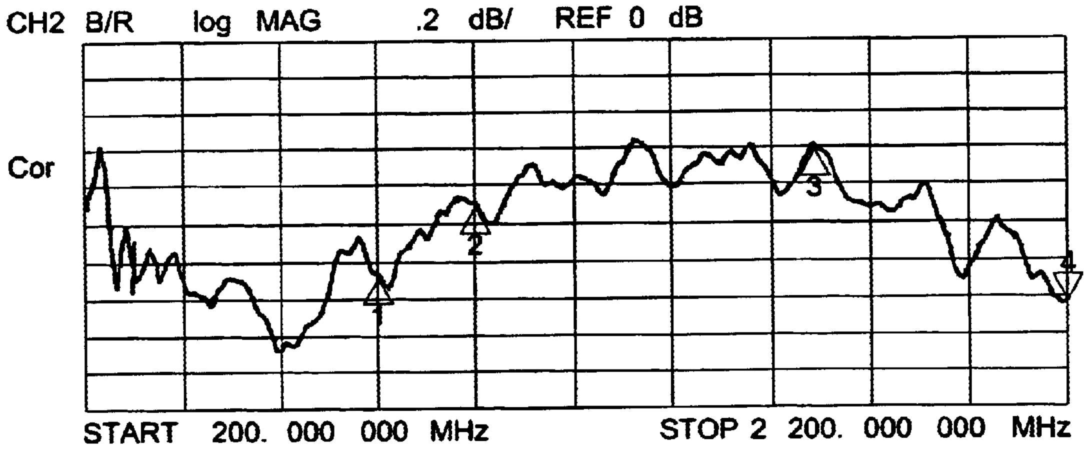
FIG. 8*b* shows test data representing the insertion loss of a center conductor tap (10 dB nominal) with respect to operating frequency.

FIGS. 8*a* and 8*b* show test data for coupling factor and insertion losses of a Andrew Corporation Radiax™ Cable Tap (center conductor tap connector) attached to LDF4, ½ inch diameter, co-axial cable manufactured by Andrew Corporation. Note the scale of the insertion loss plot is 0.2 dB/division.

Figure 9A:
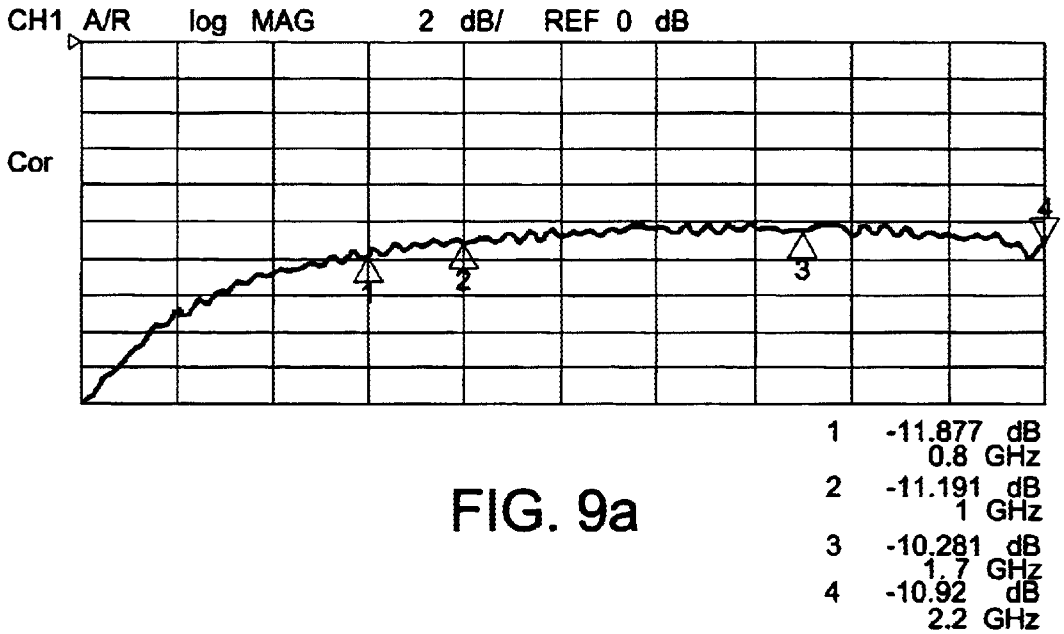
FIG. 9*a* shows test data representing the coupling loss with respect to operating frequency of a first embodiment of the invention.
Figure 9B:
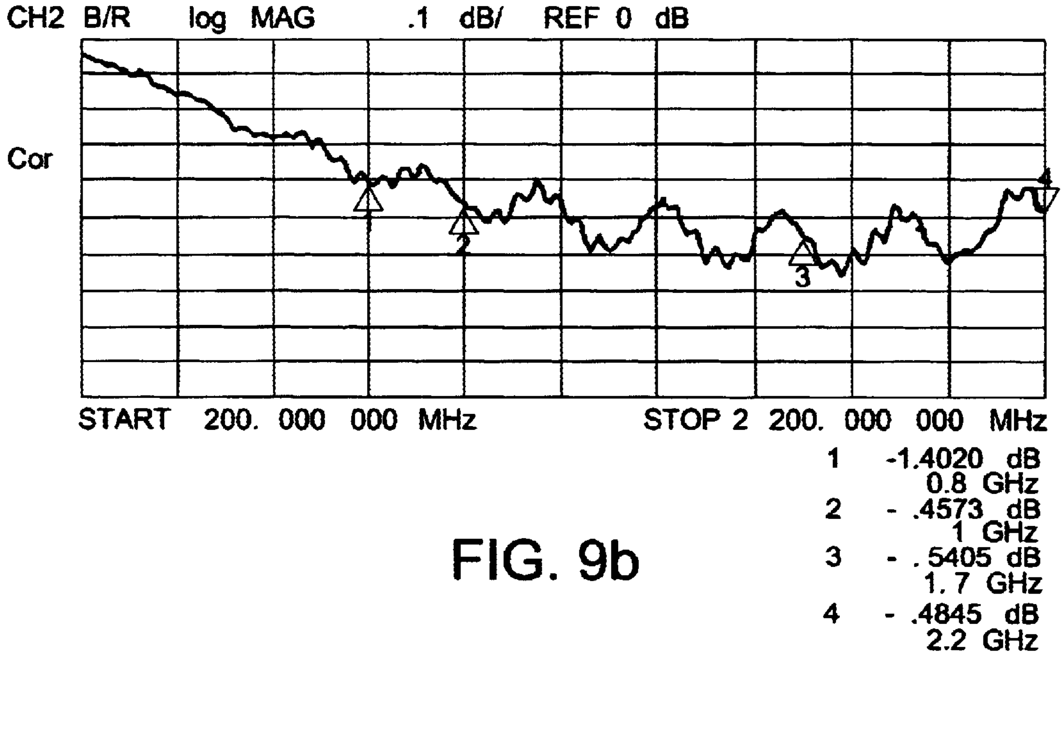
FIG. 9*b* shows test data representing the insertion loss with respect to operating frequency of the first embodiment of the invention.

FIGS. 9*a* and 9*b* show test data for coupling factor and insertion losses of a tap connector according to the first embodiment of the invention with an open ended rectangular channel 40 having a width W of 0.63 inches (arc length) and a length L of 1.5 inches formed in LDF4 cable manufactured by Andrew Corporation. Connections are soldered and the cover 30 is removed. Note the scale of the insertion loss plot is 0.1 dB/division.

Figure 10A:
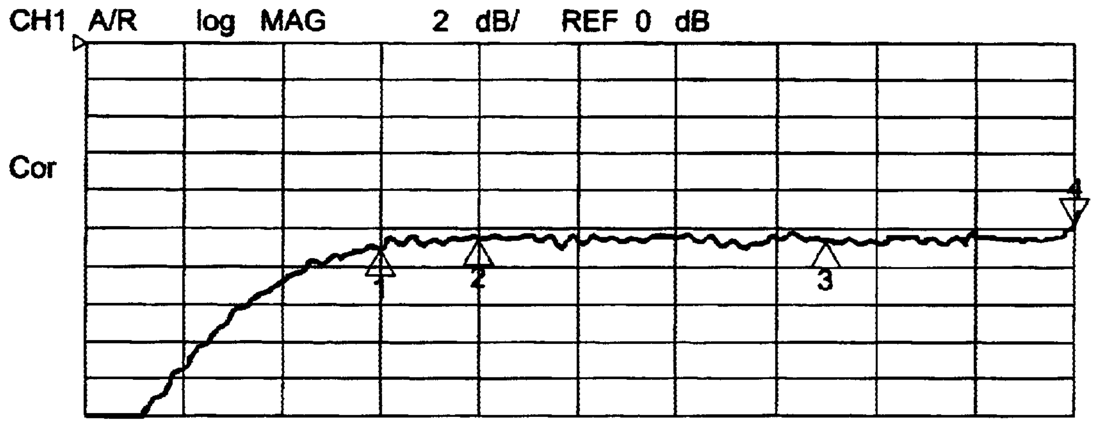
FIG. 10*a* shows test data representing the coupling loss with respect to operating frequency of a second embodiment of the invention.
Figure 10B:
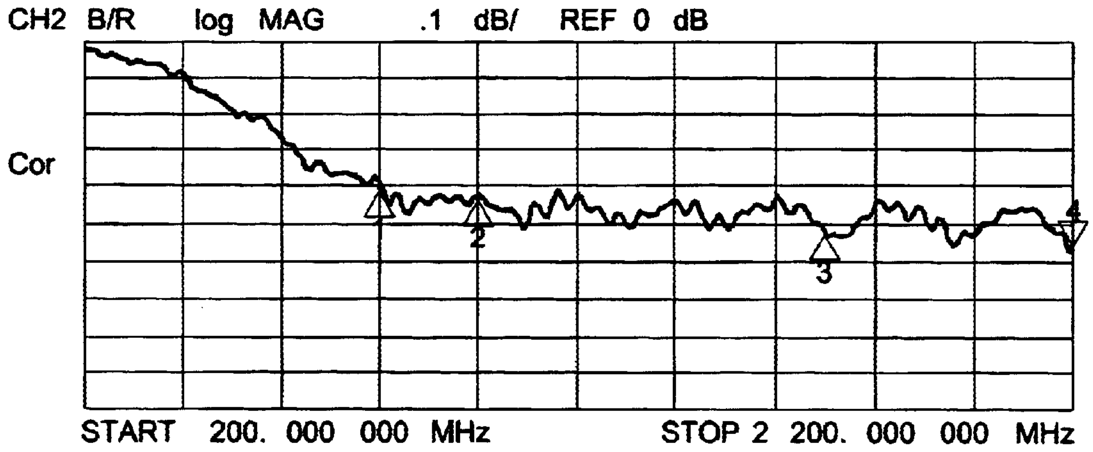
FIG. 10*b* shows test data representing the insertion loss with respect to operating frequency of the second embodiment of the invention.

FIGS. 10*a* and 10*b* show test data for coupling factor and insertion losses of a tap connector according to the second embodiment of the invention with a rectangular trough 60 having a width W of 0.63 inches (arc length along the trunk outer conductor 13) and a length L of 1.62 inches formed in LDF4 cable manufactured by Andrew Corporation. Connections are soldered and the cover 30 is removed. Note the scale of the insertion loss plot is 0.1 dB/division.

Figure 11:
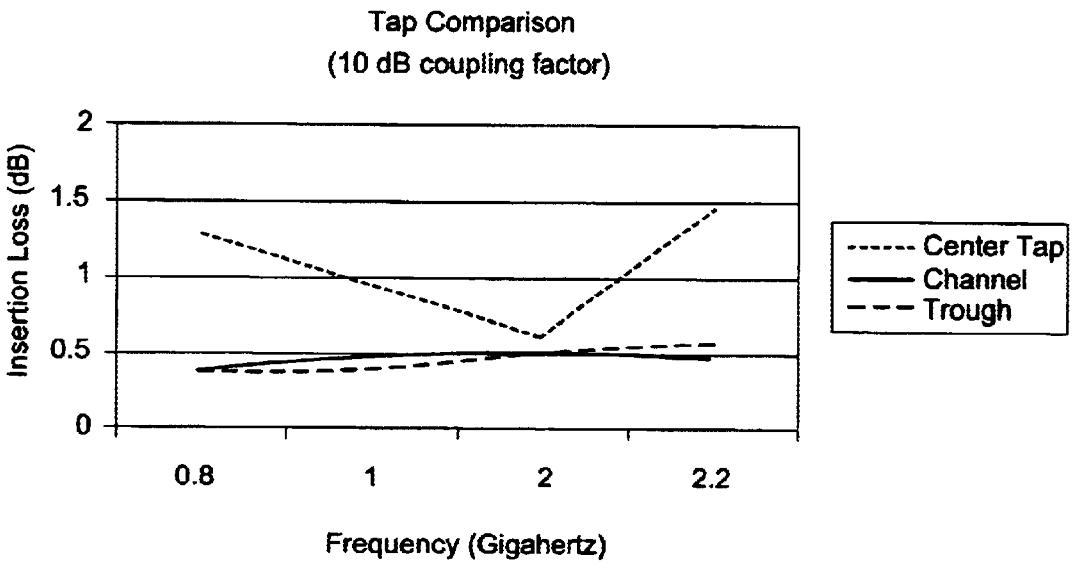
FIG. 11 shows a chart comparing the insertion loss with respect to operating frequency test data from FIGS. 8*b*, 9*b* and 10*b*.

Frequency test points in the FIG. 8*a*–10*b* are identified at 0.8, 1.0, 2.0 and 2.2 Gigahertz. For comparison, the coupling factors of each device are intended to be in the area of 10 dB but have not been tuned to be exactly the same and therefore the different insertion losses should be viewed accordingly. As shown by the comparison chart in FIG. 11, the test data demonstrates that the invention provides a significant broadband decrease in insertion loss, when compared to the performance of prior center conductor contacting cable taps.

Figure 12:
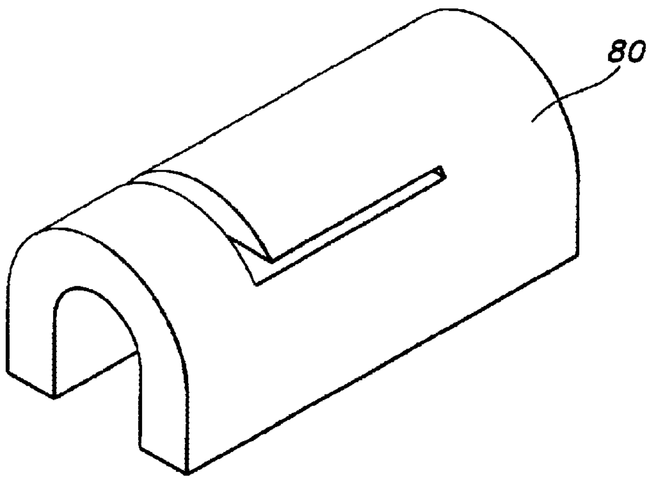
FIG. 12 is an isometric view of a fixture usable for guiding a cutting tool for forming a channel having specific dimensions.

As shown in FIG. 12, a fixture 80, jig or cutting guide may be supplied to guide a cutting tool during formation of the channel or trough. A plurality of fixtures in a tap kit may define a range of different channel/trough dimensions thereby enabling a user to form a channel/trough dimensioned for a specific coupling factor. Alternatively, a single fixture may be configured with graduations identifying widths and or lengths associated with specific coupling factors.

As described, the shield slot tap provides the following advantages. The shield slot tap has a reduced insertion loss and may be formed without any external elements beyond the trunk cable 10 and the tap cable 20, thereby decreasing component costs.

[1]

Table of Parts

| | |
|---|---|
| 10 | trunk cable |
| 11 | trunk center conductor |
| 13 | trunk outer conductor |
| 15 | dielectric |
| 20 | tap cable |
| 22 | tap center conductor |
| 24 | tap outer conductor |
| 26 | tap dielectric |
| 30 | cover |
| 33 | RF shield |
| 35 | elongated strap |
| 40 | channel |
| 50 | inside coupling point |
| 52 | outside coupling point |
| 60 | trough |
| 62 | conductor |
| 64 | insulator substrate |
| 70 | conductor/shield coupling |
| 80 | fixture |

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention if the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. A cable tap for coupling a co-axial trunk cable having a trunk outer conductor, to a tap cable having a first conductor and a second conductor, comprising: a channel formed in the trunk outer conductor; the channel forming an electrical discontinuity that is less than a complete break in the outer conductor; the first conductor coupled to a first side of the channel; and the second conductor coupled to a second side of the channel.

2. The cable tap of claim 1, wherein the channel forms an electrical break between the first and second sides of the channel.

3. The cable tap of claim 2, wherein the channel is arranged with an open end aligned with the longitudinal axis of the trunk cable.

4. The cable tap of claim 1, wherein the channel has one of an open ended rectangular shape, a U-shape and a V-shape.

5. The cable tap of claim 1, further including a cover that covers the channel, a first coupling point of the first conductor and a second coupling point of the second conductor.

6. The cable tap of claim 5, wherein the cover has an RF shield.

7. The cable tap of claim 1, wherein the coupling of the first conductor and the second conductor is via one of soldering, spring clip and direct mechanical connection.

8. The cable tap of claim 1, wherein the coupling of the first conductor and the second conductor is via mechanical compression.

9. The cable tap of claim 8, wherein the mechanical compression is via one of elongated strap and mechanical clamp.

10. A cable tap for coupling a co-axial trunk cable having a trunk outer conductor, to a tap cable having a first conductor and a second conductor, comprising: a trough formed between a first and a second area of the trunk outer conductor; a trough conductor located proximate the trough with an electrical connection between a first area of the trough conductor and the first area of the trunk outer conductor; the first conductor coupled to the second area of the trunk outer conductor; and the second conductor coupled to a second area of the trough conductor.

11. The cable tap of claim 10, wherein the trough conductor is located on an insulating substrate.

12. The cable tap of claim 11, wherein the insulating substrate is a printed circuit board and the trough conductor is an electrical trace on the printed circuit board.

13. The cable tap of claim 11, wherein the insulating substrate is arranged to engage the trunk outer conductor, maintaining the trough conductor in a desired location.

14. The cable tap of claim 10, wherein an RF current path between the first conductor and the second conductor, along the trunk outer conductor is interupted by the trough and trough conductor.

15. The cable tap of claim 10, further including a cover that covers the trough, a first coupling point of the first conductor and a second coupling point of the second conductor.

16. The cable tap of claim 15, wherein the cover has an RF shield.

17. The cable tap of claim 10, wherein the coupling of the first conductor and the second conductor is via one of soldering, spring clip and direct mechanical connection.

18. The cable tap of claim 10, wherein the coupling of the first conductor and the second conductor is via mechanical compression.

19. The cable tap of claim 18, wherein the mechanical compression is via one of elongated strap and mechanical clamp.

20. A method for tapping a co-axial trunk cable having a trunk outer conductor with a tap cable having a first conductor and a second conductor, comprising the steps of: forming a trough in the trunk outer conductor between a first and a second area of the trunk outer conductor; locating a trough conductor proximate to the trough and coupling a first end of the trough conductor to the first area of the trunk outer conductor; coupling the first conductor to the trough conductor; and coupling the second conductor to the second area of the trunk outer conductor.

21. The method of claim 20, wherein the conductor is located on an insulating substrate.

22. The method of claim 21 wherein the insulating substrate configured to be retainably fit into the trough.

23. The method of claim 20, further including the step of covering the trough and a coupling area of the trunk outer conductor to the tap cable with a cover.

24. The method of claim 20, wherein the trough conductor is electrically isolated from the trunk outer conductor.

25. The method of claim 20, wherein one of the trough and the trough conductor are dimensioned to provide a desired coupling factor.

26. A coaxial trunk cable in combination with a tap, comprising: a coaxial trunk cable adapted to transmit RF signals and having an outer conductor configured with a channel to create a voltage potential between first and second connection points on the outer conductor; the channel forming an electrical discontinuity that is less than a complete break in the outer conductor; and a tap comprising a first conductor electrically coupled to said first connection point and a second conductor electrically coupled to said second connection point.

27. The combination defined by claim 26, wherein said channel comprises an elongated opening, and wherein said first and second connection points are located on opposite sides of said channel.

28. The combination defined by claim 27, wherein said channel comprises one of a U-shaped and a V-shaped slot whose axis is aligned with a main axis of the trunk cable.

29. The combination defined by claim 26, wherein said tap comprises a coaxial cable with an inner conductor connected to said first connection point and an outer conductor connected to said second connection point.

* * * * *